United States Patent
Kaneko et al.

(10) Patent No.: US 12,459,140 B2
(45) Date of Patent: Nov. 4, 2025

(54) ISOLATOR AND METHOD FOR STERILIZING SAME

(71) Applicant: Hitachi Industrial Equipment Systems Co., Ltd., Tokyo (JP)

(72) Inventors: Takeshi Kaneko, Tainai (JP); Takeshi Matsumura, Tainai (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 1011 days.

(21) Appl. No.: 17/609,869

(22) PCT Filed: Apr. 27, 2020

(86) PCT No.: PCT/JP2020/017924
§ 371 (c)(1),
(2) Date: Nov. 9, 2021

(87) PCT Pub. No.: WO2021/005868
PCT Pub. Date: Jan. 14, 2021

(65) Prior Publication Data
US 2022/0212355 A1    Jul. 7, 2022

(30) Foreign Application Priority Data

Jul. 5, 2019 (JP) .................................. 2019-126112

(51) Int. Cl.
*B25J 21/02* (2006.01)
*A61L 2/20* (2006.01)
*A61L 9/015* (2006.01)

(52) U.S. Cl.
CPC ............... *B25J 21/02* (2013.01); *A61L 2/20* (2013.01); *A61L 9/015* (2013.01);
(Continued)

(58) Field of Classification Search
CPC .. B25J 21/02; B01L 1/00; A61L 2/208; A61L 2209/211
See application file for complete search history.

(56) References Cited

U.S. PATENT DOCUMENTS

| 2010/0189607 A1* | 7/2010 | Yokoi ...................... A61L 2/22 422/600 |
| 2011/0058986 A1 | 3/2011 | Yokoi et al. |
| 2020/0171188 A1 | 6/2020 | Kaneko et al. |

FOREIGN PATENT DOCUMENTS

| JP | 2009-226047 A | 10/2009 |
| JP | 2010-069255 A | 4/2010 |

(Continued)

OTHER PUBLICATIONS

Britannica Dictionary, "Circulate", Definition Retrieved from Web, 2024 (Year: 2024).*

(Continued)

*Primary Examiner* — Jennifer Wecker
*Assistant Examiner* — Brady C Pilsbury
(74) *Attorney, Agent, or Firm* — Volpe Koenig

(57) ABSTRACT

There is provided an isolator that is capable of improving work efficiency by shortening a sterilization time, and that is capable of securing a sterility assurance level. An isolator, in which a circulation fan above a work room supplies clean air to the work room via a HEPA filter, includes: the work room; a front door provided in a front surface of the work room; a glove provided in the front door; and an air supply unit that causes an air supply HEPA filter to clean air taken in from an air supply airtight damper, and that causes an air supply fan to supply the clean air into the isolator, when work is performed. When a sterilization gas is removed, the air supply unit is configured such that the air supply fan circulates the air inside the isolator through a sterilization gas-removing catalyst.

9 Claims, 4 Drawing Sheets

(52) U.S. Cl.
CPC ....... *A61L 2202/13* (2013.01); *A61L 2202/15* (2013.01); *A61L 2209/14* (2013.01)

(56) References Cited

FOREIGN PATENT DOCUMENTS

| | | | |
|---|---|---|---|
| JP | 2016-117003 A | 6/2016 | |
| JP | 2017209300 A * | 11/2017 | |
| JP | 2019-000304 A | 1/2019 | |
| WO | WO-2013186518 A1 * | 12/2013 | ................ A61J 1/00 |
| WO | 2019/012696 A1 | 1/2019 | |

OTHER PUBLICATIONS

Machine Translation of JP 2019-000304 A, cited in IDS filed Nov. 9, 2021 (Year: 2019).*
Chinese Office Action issued on Aug. 2, 2022 for Chinese Patent Application No. 202080038938.6.

* cited by examiner

ISOLATOR AND METHOD FOR STERILIZING SAME

TECHNICAL FIELD

The present invention relates to an isolator to be used for cell preparation, and a method for sterilizing the same.

BACKGROUND ART

When cells or microorganisms are handled in research on pathogens, etc., regenerative medical treatments, etc. an isolator or a safety cabinet is to be used.

In the isolator that is a closed system, a worker can perform work via work gloves from the outside of an isolated work room. In the isolator, when a patient tissue to be handled is changed to another one or the type of a pathogen to be handled is changed, the sterilization of the inside of the work room or the work gloves by cleaning and disinfection is required. The sterilization is performed by supplying a sterilization gas to the work room or the gloves.

Patent Document 1 discloses one example of an isolator that supplies a sterilization substance, which has evaporated from a sterilization substance supply unit, to a work room to perform a sterilization process.

CITATION LIST

Patent Document

Patent Document 1: JP 2010-69255 A

SUMMARY OF THE INVENTION

Problems to be Solved by the Invention

In the isolator that is a closed system, a sterility assurance level can be secured by sterilizing the work room or the work gloves by means of a supply of the sterilization gas thereto. Here, the sterility assurance level (SAL) refers to a maximum survival probability of contaminants estimated to exist in a sterilized product processed in a proper sterilization step, and is expressed by $10^{-n}$. Currently, SAL $10^{-6}$ is adopted internationally, and means that the survival probability of microorganisms in a sterilized object after a sterilization operation is one millionth.

Patent Document 1 describes the isolator that raises the temperature of a heater with the supply of the sterilization substance in parallel with a gas flow path leak test, to shorten the time required for the sterilization process; however, in Patent Document 1, shortening the time for a step for removing the sterilization substance (aeration step) is not taken into consideration.

An object of the present invention is to provide an isolator that is capable of improving work efficiency by shortening a sterilization time, and that is capable of securing a sterility assurance level.

Solutions to Problems

In order to solve the problem, according to one example of the present invention, there is provided an "isolator" in which a circulation fan above a work room supplies clean air to the work room via a HEPA filter, the isolator including: the work room; a front door provided in a front surface of the work room; a glove provided in the front door; and an air supply unit that causes an air supply HEPA filter to clean air taken in from an air supply airtight damper, and that causes an air supply fan to supply the clean air into the isolator, when work is performed. When a sterilization gas is removed, the air supply unit is configured such that the air supply fan circulates the air inside the isolator through a sterilization gas-removing catalyst.

In addition, according to one example of the present invention, there is provided a "method for sterilizing an isolator" including an air supply unit that cleans air taken in from an outside to supply the clean air into the isolator, and an exhaust unit that cleans air inside the isolator to exhaust the clean air to the outside, in which a circulation fan above an work room supplies the clean air to the work room via a HEPA filter when work is performed, the method including: a decontamination step of closing an air supply damper of the air supply unit and an exhaust damper of the exhaust unit, and supplying a sterilization gas into the isolator; and an aeration step of causing an air supply fan of the air supply unit to circulate the air inside the isolator through a sterilization gas-removing catalyst, causing an exhaust fan of the exhaust unit to circulate the air inside the isolator through a sterilization gas-removing catalyst, and removing the sterilization gas, after the decontamination step ends.

Effects of the Invention

According to the present invention, the sterilization time can be shortened, the work efficiency can be improved, and a sterility assurance level can be secured.

Tasks, configurations, and effects other than those described above become apparent from the description of the following embodiments.

MODE FOR CARRYING OUT THE INVENTION

Figure 1:
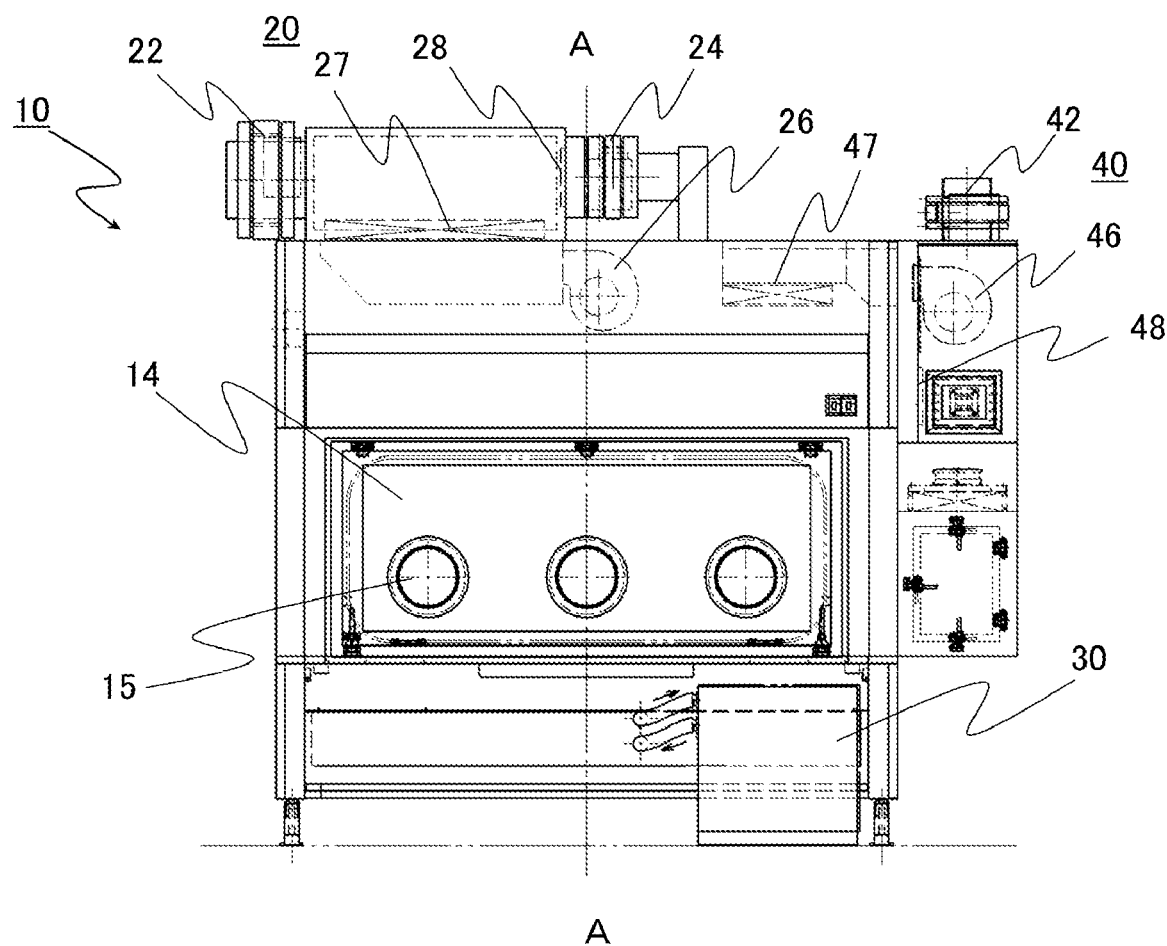
FIG. 1 is a front view illustrating one example of an isolator of a first example.

Embodiments of the present invention will be described with reference to the drawings. Incidentally, in the drawings for describing the embodiments, the same components will be denoted by the same names and reference signs as much as possible, and repeated descriptions thereof will be omitted.

First Embodiment

Figure 2:
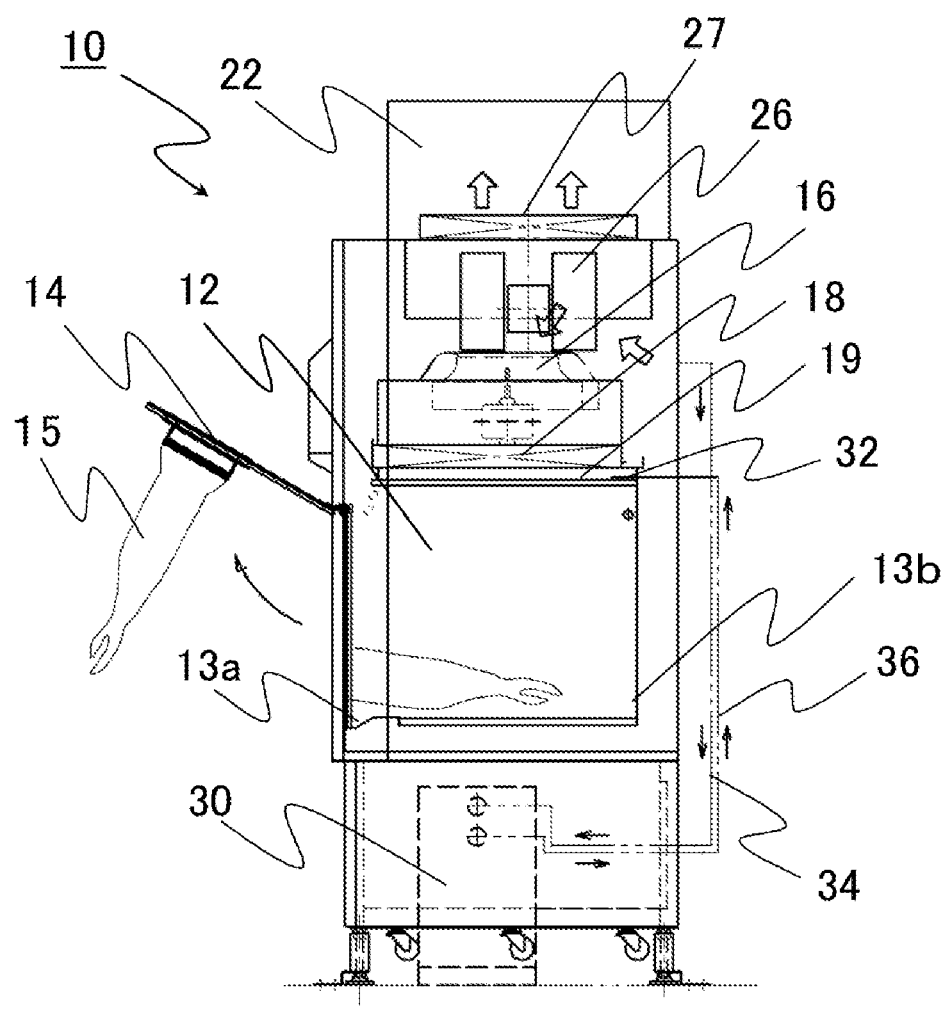
FIG. 2 is a right central cross-sectional view of one example of the isolator of the first embodiment.
Figure 3:
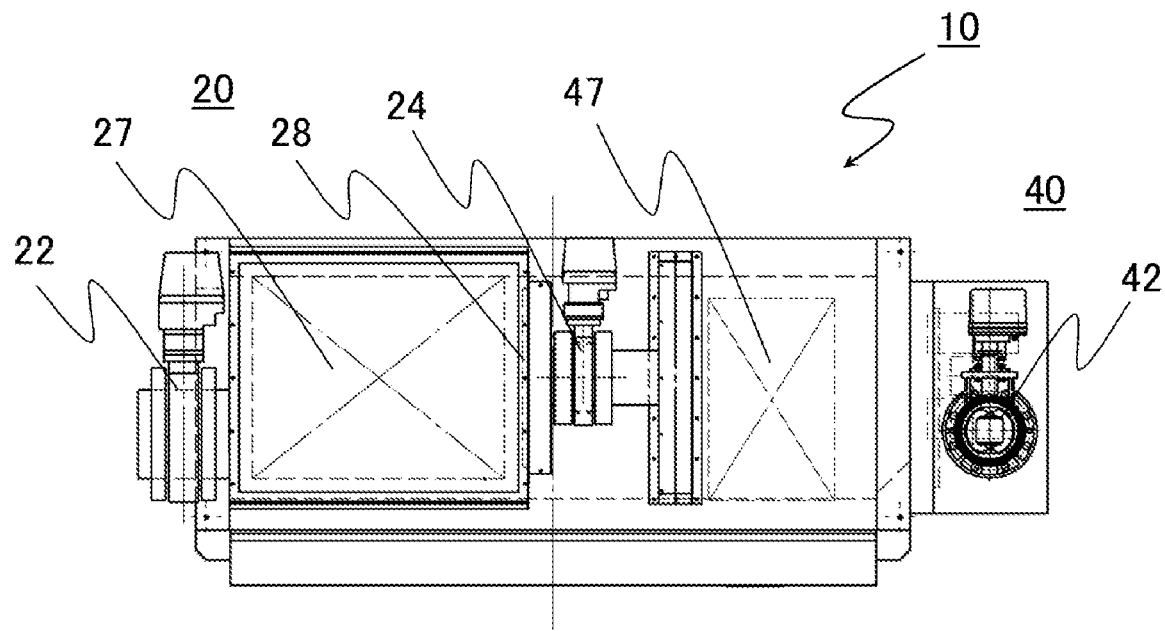
FIG. 3 is a plan view of one example of the isolator of the first embodiment.

FIG. 1 is a front view illustrating one example of an isolator of a first embodiment, FIG. 2 is a right central cross-sectional view thereof (cross-sectional view taken along line A-A in FIG. 1), and FIG. 3 is a plan view seen from above.

A work room 12 in which the work of handling specimens such as pathogens is to be performed is provided inside a case (housing). A front surface of the work room 12 is provided with a front door 14 covering an opening portion, and a lower portion of the front door 14 is provided with gloves 15 into which a worker can insert the hands to perform work. A circulation fan 16 is provided above the work room 12, a circulation HEPA filter 18 and a punching plate 19 are provided downstream of the circulation fan 16, and clean straightened air is to be supplied to the work room 12. A front slit (front suction port) 13a is provided on a front surface side of a lower portion of the work room 12, and suctions air into the work room. In addition, air inside the work room is to be suctioned from a back slit (rear suction port) 13b provided on a back surface side. Air circulates in such a manner that the air suctioned through the slits 13a and 13b returns to an upstream side of the circulation fan 16 through ducts provided on side surfaces and back surfaces of the work room. An exhaust unit 20 is provided on an upper left side of the isolator, and a part of circulating air is to be fed to an exhaust HEPA filter 27 by an exhaust fan 26 and to be exhausted to the outside from an exhaust airtight damper 22 provided on an upper surface of the case. In addition, an air supply unit 40 is provided above right side portion of the isolator, an air supply HEPA filter 47 cleans air taken in from an air supply airtight damper 42, and an air supply fan 46 supplies the clean air into the isolator. Here, the HEPA filter is an abbreviation for a high efficiency particulate air filter.

The front door 14 of the work room 12 is made of, for example, transparent glass or resin, and allows a worker to see work to be performed with the hands. In addition, the front door 14 is configured to be rotatable as indicated by an arrow in FIG. 2 to be opened and closed. The front door 14 can be closed and sealed when work is performed, and can be opened during inputting of instruments and materials to allow the entry and exit of the instruments, etc. In the isolator of FIG. 1, two circulation fans 16, two circulation HEPA filters 18, etc. are provided in bilateral symmetry, but only one set may be provided.

The isolator includes a sterilization gas generation device 30 to be used for sterilization, supplies a sterilization gas such as hydrogen peroxide gas to the work room 12 from a condition (outgoing) path 36 during a sterilization step, and sprays the sterilization gas from a sterilization gas inlet port 32. The sterilization gas circulates through a flow path of the isolator, and a part of the sterilization gas returns to the sterilization gas generation device 30 through a condition (return) path 34.

The isolator is provided with an aeration path for removing the sterilization gas after the sterilization step ends. As the aeration path, for example, as illustrated in the front view of FIG. 1, in the exhaust unit 20, an exhaust $H_2O_2$ catalyst unit 28 that absorbs the sterilization gas is provided in a blowout path of an exhaust fan 26, and the exhaust airtight damper 22 is to be closed and a circulation airtight damper 24 is to be opened to allow the sterilization gas to circulate inside the safety cabinet. The exhaust $H_2O_2$ catalyst unit 28 adsorbs the sterilization gas. In addition, in the air supply unit 40, an air supply $H_2O_2$ catalyst unit 48 is provided on a suction side of the air supply fan 46, and the air supply airtight damper 57 is to be closed to allow the sterilization gas to circulate inside the isolator. The air supply $H_2O_2$ catalyst unit 48 adsorbs the sterilization gas.

A sterilization process is to be performed roughly as follows (refer to FIG. 5).

(1) Dehumidification Step

Humidity is to be lowered by dry air. The lowering of the humidity keeps the required concentration of a sterilization gas (for example, hydrogen peroxide gas) to a saturation level or less during the following conditioning step and the following decontamination step. Returning air passes through a dry cartridge to dried and heated.

(2) Conditioning Step

While a sterilization agent is injected into airstreams, the dry air continues to circulate until immediately before the sterilization gas leaves the isolator. The conditioning step is a step of causing the sterilization concentration to reach a target sterilization concentration rapidly.

(3) Decontamination Step

For a specified time, the sterilization agent causes the entire concentration of the sterilization gas inside the isolator to be maintained, and sterilizes the work room, the HEPA filter, etc.

(4) Aeration Step

The injection of the sterilization agent is to be stopped, and the airstreams circulate through the aeration path including the catalyst units that adsorb the sterilization gas. Then, the dry air is to be circulated for a certain time to lower the concentration of the sterilization gas inside the isolator and connection hoses.

Figure 4:
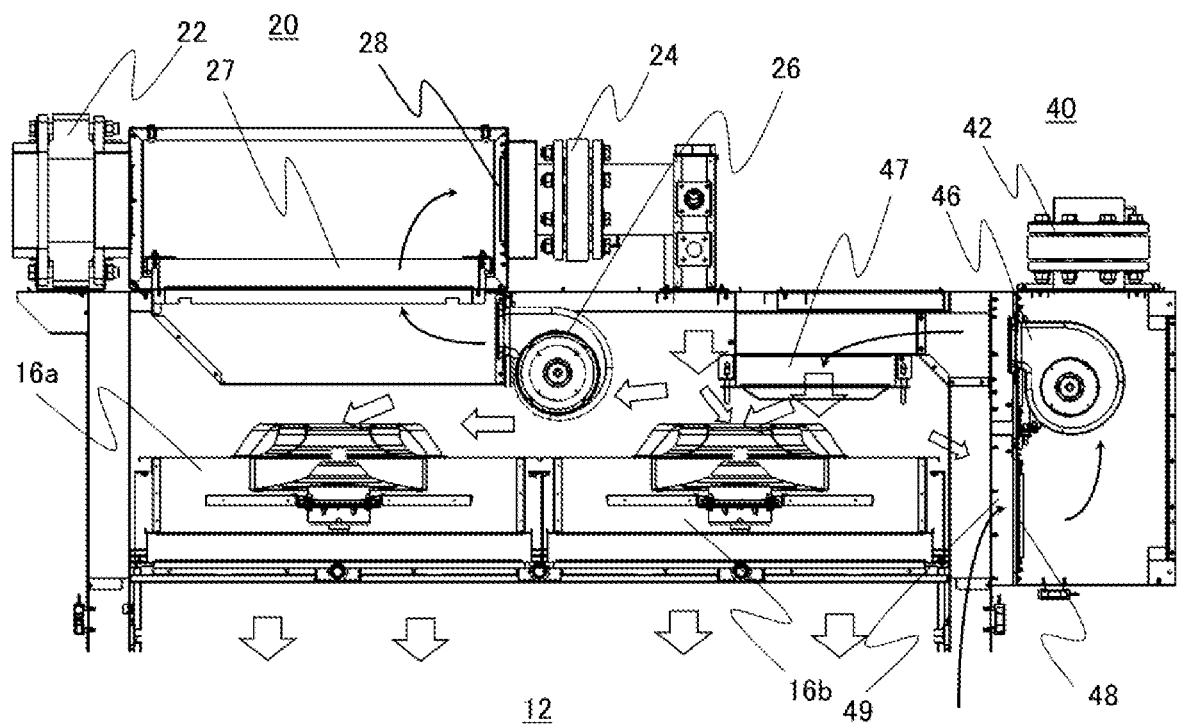
FIG. 4 is a view illustrating a positional relationship between an exhaust unit and an air supply unit, and circulation fans of the isolator of the first embodiment.

An operation in the present embodiment will be described with reference to the drawing of FIG. 4 illustrating a positional relationship between the exhaust unit and the air supply unit, and the circulation fans.

The exhaust unit 20 is provided on the upper left side of the isolator, and the exhaust unit 20 includes the exhaust fan 26, the exhaust HEPA filter 27, the exhaust airtight damper 22, the exhaust $H_2O_2$ catalyst unit 28, and the circulation airtight damper 24. When work is performed in the isolator, the circulation airtight damper 24 is closed, the exhaust airtight damper 22 is opened, a part of air circulating inside the isolator is to be fed to the exhaust HEPA filter 27 by the exhaust fan 26, and cleaned air is to be exhausted to the outside from the exhaust airtight damper 22.

During the sterilization process, the exhaust airtight damper 22 is to be closed, and the circulation airtight damper 24 is to be opened. Then, in the aeration step (step of removing a sterilization substance), the exhaust fan 26 circulates air containing the sterilization gas through the exhaust HEPA filter 27, the exhaust $H_2O_2$ catalyst unit 28, and the circulation airtight damper 24, and the sterilization gas is to be adsorbed on the exhaust $H_2O_2$ catalyst unit 28. As illustrated in FIG. 4, an outlet for the circulating air is disposed in an upper portion of a right circulation fan 16b. The circulating air is to be blown out to the upper portion of the right circulation fan 16b, and a part of the air and another part of the air are to be blown to the work room 12 from the right circulation fan 16b and from a left circulation fan 16a, respectively.

The air supply unit 40 is provided above the right side portion of the isolator, and the air supply unit 40 includes the air supply airtight damper 42, the air supply fan 46, the air supply HEPA filter 47, and the air supply $H_2O_2$ catalyst unit 48. When work is performed in the isolator, the air supply airtight damper 42 is opened, the air supply HEPA filter cleans air taken in from the air supply airtight damper 47, and the air supply fan 46 supplies the clean air into the isolator.

During the sterilization process, the air supply airtight damper 42 is to be closed. Then, in the aeration step (step of removing the sterilization substance), the air supply fan 46 circulates air containing the sterilization gas inside the isolator through the air supply HEPA filter 47 and the air supply $H_2O_2$ catalyst unit 48, and the sterilization gas is to be adsorbed on the air supply $H_2O_2$ catalyst unit 48. In this case, an air intake port 49 of a circulation path is provided in an upper portion of the duct provided on the side surface of the work room 12, so that the sterilization gas in the air which has passed through the work room 12 can also be effectively removed. As illustrated in FIG. 4, the outlet for the circulating air is disposed in the upper portion of the right circulation fan 16b. The circulating air is to be blown out to the upper portion of the right circulation fan 16b, and a part of the air and another part of the air are to be blown to the work room 12 from the right circulation fan 16b and the left circulation fan 16a, respectively.

Figure 5:
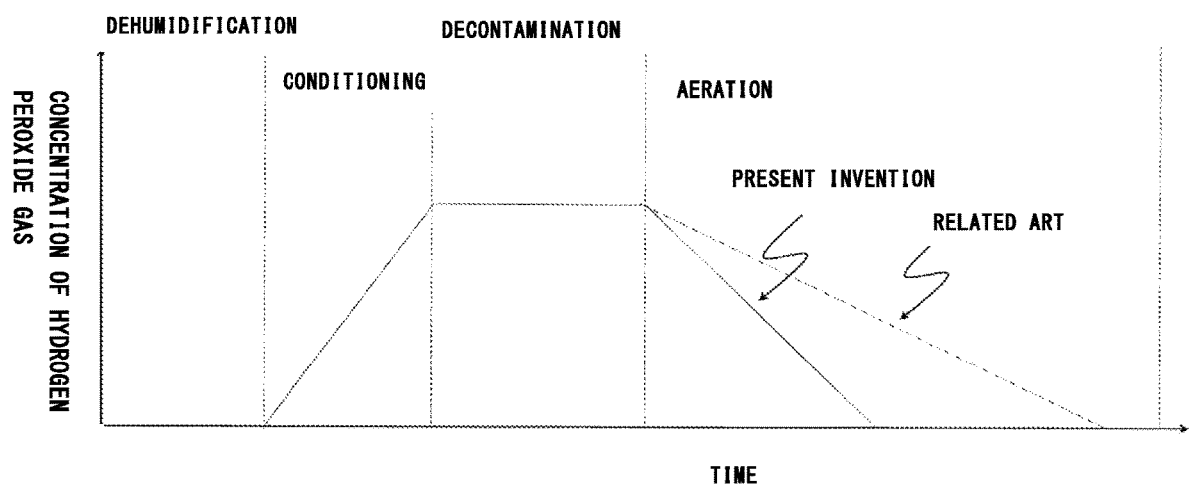
FIG. 5 is a graph illustrating a change in the concentration of hydrogen peroxide gas in each step of a sterilization cycle.

FIG. 5 illustrates a change in the concentration of hydrogen peroxide gas that is a sterilization gas in four steps of the sterilization process in the present invention and in the related art. The time for the aeration step is shortened in the present invention more significantly than in the related art. Here, in the related art, gas containing a sterilization gas in the gas flow path passes through a sterilization substance-removing filter of a gas exhaust unit once to be exhausted to the outside. In the case where the sterilization gas-removing catalyst and the exhaust HEPA filter are provided on a suction side of the exhaust fan and the sterilization gas is to be exhausted to the room, when high-concentration hydrogen peroxide gas passes through the catalyst during aeration, detoxification, for example, a reduction in concentration from 1,000 ppm to 1 ppm or less with one pass is required. For that reason, a large quantity of the catalysts is required, catalyst resistance increases, an aeration efficiency is poor, and the sterilization time is lengthened. In addition, electric power consumption increases, thereby resulting in high cost. In addition, when the sterilization gas passes through the catalysts only once, in a case where a catalyst function does not work or there are gaps between the catalysts, high-concentration sterilization gas leaks into the room, which is dangerous.

According to the present embodiment, since the circulation path is formed and the sterilization gas-removing catalysts are provided in the exhaust unit including the exhaust fan and in the air supply unit including the air supply fan, catalyst resistance can be reduced, the sterilization time can be shortened, and the work efficiency can be improved. In addition, since the air that has passed through the sterilization gas-removing catalysts is not exhausted to the outside of the room and only circulates inside the isolator, high-concentration hydrogen peroxide gas can be prevented from leaking to the outside of the isolator, and safety can be secured.

In addition, according to the present embodiment, since the disposition is such that low-concentration air which has passed through the catalyst of the air supply unit and the catalyst of the exhaust unit is to be suctioned to inlets of the circulation fans, the flow speed of the air can be increased, and the sterilization time can be significantly shortened.

Incidentally, in the present embodiment, the sterilization gas-removing catalysts are disposed in both the air supply unit and the exhaust unit, and air containing the sterilization gas circulates therethrough; however, the sterilization gas-removing catalyst may be disposed in only one thereof, and air containing the sterilization gas may circulate therethrough. In addition, the air supply units may be provided above the right side portion and above a left side portion of the isolator, a blowout port of the air supply unit disposed above the right side portion may be disposed near the inlet of the right circulation fan, and a blowout port of the air supply unit disposed on the left side portion may be disposed near the inlet of the left circulation fan.

Second Embodiment

Figure 6:
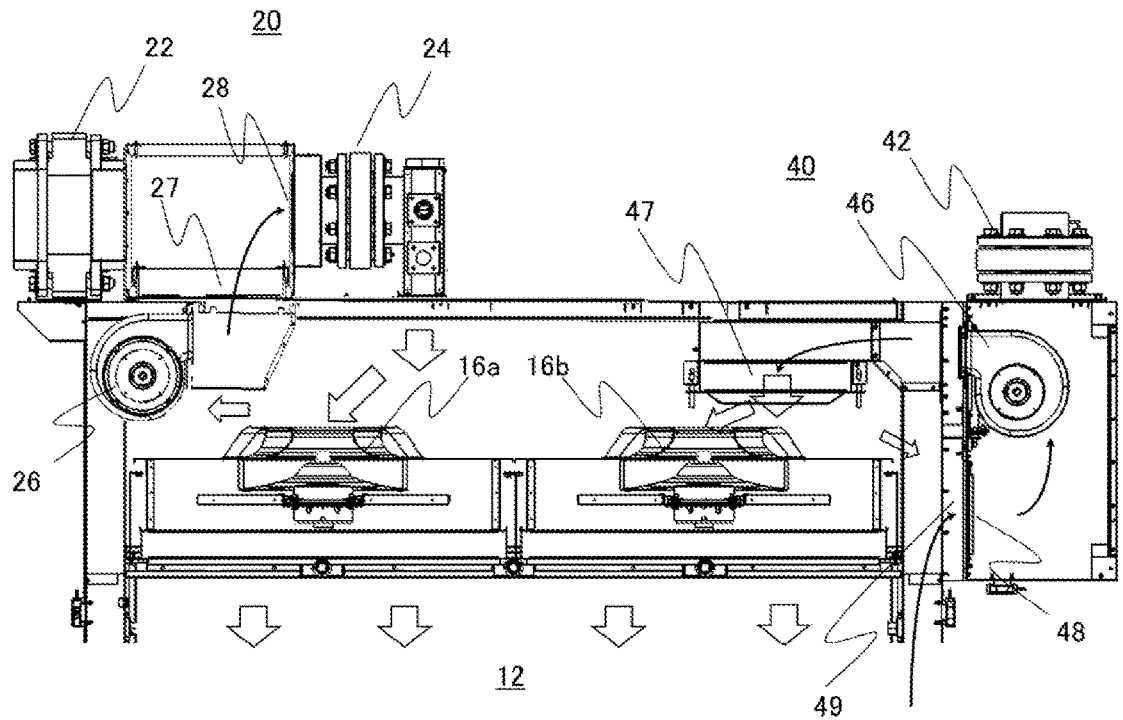
FIG. 6 is a view illustrating a positional relationship between the exhaust unit and the air supply unit, and the circulation fans of an isolator of a second embodiment.

FIG. 6 illustrates a positional relationship between the exhaust unit and the air supply unit, and the circulation fans of a second embodiment of the present invention. In the second embodiment, the size of the exhaust unit is reduced, a blowout port for air from the exhaust unit during aeration is disposed above the left circulation fan.

The exhaust unit 20 is provided on the upper left side of the isolator, and the exhaust unit 20 includes the exhaust fan 26, the exhaust HEPA filter 27, the exhaust airtight damper 22, the exhaust $H_2O_2$ catalyst unit 28, and the circulation airtight damper 24.

During the sterilization process, the exhaust airtight damper 22 is to be closed, and the circulation airtight damper 24 is to be opened. Then, in the aeration step (step of removing the sterilization substance), the exhaust fan 26 circulates air containing the sterilization gas through the exhaust HEPA filter 27 and the exhaust $H_2O_2$ catalyst unit 28, and the sterilization gas is to be adsorbed on the exhaust $H_2O_2$ catalyst unit 28. As illustrated in FIG. 6, the outlet for the circulating air is disposed in the upper portion of the left circulation fan 16a, and the circulating air is to be taken into the left circulation fan 16a and to be fed to the work room 12.

Meanwhile, the configuration of the air supply unit 40 is the same as that in the first embodiment, and the outlet for the circulating air is disposed in the upper portion of the right circulation fan 16b, and the circulating air is to be taken into the right circulation fan 16b and to be fed to the work room 12.

According to the present embodiment, in the isolator including two right and left circulation fans, the blowout port of the air supply unit is provided above one circulation fan, and the blowout port of the exhaust unit is provided above the other circulation fan, so that low-concentration gas can be uniformly supplied to the work room, and the sterilization time can be shortened.

REFERENCE SIGNS LIST

10 Isolator
12 Work room
13a Front slit
13b Back slit
14 Front door
15 Glove
16 Circulation fan
18 Circulation HEPA filter
19 Punching plate
20 Exhaust unit
22 Exhaust airtight damper
24 Circulation airtight damper 26 Exhaust fan
27 Exhaust HEPA filter
28 Exhaust $H_2O_2$ catalyst unit
30 Sterilization gas generation device
32 Sterilization gas inlet port
34 Condition (return) path
36 Condition (outgoing) path
40 Air supply unit
42 Air supply airtight damper
46 Air supply fan
47 Air supply HEPA filter
48 Air supply $H_2O_2$ catalyst unit
49 Air intake port

The invention claimed is:

1. An isolator comprising:
a circulation fan above a work room that supplies clean air to the work room via a high efficiency particulate air (HEPA) filter, a front door provided in a front surface of the work room;
a glove provided in the front door;
an air supply unit that causes the HEPA filter to clean air taken in from an air supply airtight damper, and that causes an air supply fan to supply the clean air into the isolator, when work is performed;
an exhaust unit that causes an exhaust HEPA filter to clean the air inside the isolator, and that causes an exhaust fan to exhaust the clean air to an outside from an exhaust airtight damper, when work is performed,
wherein when a sterilization gas is removed, the air supply fan recirculates air inside the isolator through a first sterilization gas-removing catalyst, and
wherein when the sterilization gas is removed, the exhaust fan recirculates the air inside the isolator through a second sterilization gas-removing catalyst.

2. The isolator according to claim 1, wherein a blowout port of the air supply unit is disposed in sufficient proximity to an inlet of the circulation fan such that air supplied from the air supply unit is in fluid communication with the circulation fan.

3. The isolator according to claim 1, wherein the air supply unit is disposed above a side portion of the isolator, and
an air intake port of the air supply unit inside the isolator is disposed in an upper portion of a duct provided on a side surface of the work room.

4. The isolator according to claim 2, further comprising:
a right circulation fan and a left circulation fan; and
a first air supply unit above a right side portion of the isolator and a second air supply unit above a left side portion of the isolator,
wherein a first blowout port of the first air supply unit is disposed in sufficient proximity to an inlet of the right circulation fan such that the air supplied from the first air supply unit is in fluid communication with the right circulation fan, and
a second blowout port of the second air supply unit is disposed in sufficient proximity to an inlet of the left circulation fan such that the air supplied from the second air supply unit is in fluid communication with the left circulation fan.

5. The isolator according to claim 1,
wherein a blowout port of the exhaust unit is disposed in sufficient proximity to an inlet of the circulation fan such that exhausted air from the exhaust unit is in fluid communication with the circulation fan.

6. The isolator according to claim 1, further comprising:
a right circulation fan and a left circulation fan,
wherein a blowout port of the air supply unit and a blowout port of the exhaust unit are disposed in sufficient proximity to inlets of the right circulation fan and left circulation fan such that the air supplied from the air supply unit and exhausted air from the exhaust unit are in fluid communication with the respective circulation fans.

7. The isolator according to claim 1,
wherein the exhaust unit is disposed in an upper portion of the isolator.

8. An isolator comprising:
a circulation fan above a work room that supplies clean air to the work room via an exhaust high efficiency particulate air (HEPA) filter;
a front door provided in a front surface of the work room;
a glove provided in the front door; and
an exhaust unit that causes the exhaust HEPA filter to clean air inside the isolator, and that causes an exhaust fan to exhaust the clean air to an outside from an exhaust airtight damper, when work is performed,
wherein when a sterilization gas is removed, the exhaust fan recirculates air inside the isolator through a sterilization gas-removing catalyst.

9. A method for sterilizing an isolator, the method comprising
cleaning, by an air supply unit, air taken in from an outside to supply clean air into the isolator,
cleaning, by an exhaust unit, air inside the isolator to exhaust the clean air to outside;
supplying the clean air to a work room of the isolator via a high efficiency particulate air (HEPA) filter when work is performed; performing a decontamination step that includes closing an air supply damper of the air supply unit and an exhaust damper of the exhaust unit, and supplying a sterilization gas into the isolator; and
recirculating the air inside the isolator through a first sterilization gas-removing catalyst,
removing the sterilization gas, after the decontamination step is completed; and
when the sterilization gas is removed, recirculating, by a exhaust fan, the air inside the isolator through a second sterilization gas-removing catalyst, wherein the exhaust fan exhausts the clean air to an outside from an exhaust airtight damper, when work is performed.

* * * * *